Figure 1:
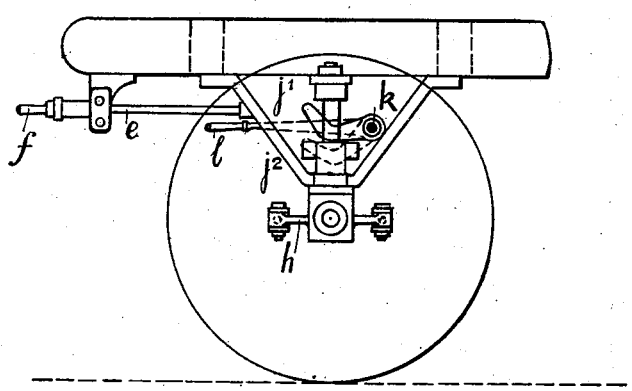

No. 724,836. PATENTED APR. 7, 1903.
JOSEPH FIELD & JAMES FIELD.
STEERING GEAR FOR VEHICLES.
APPLICATION FILED APR. 28, 1902.

NO MODEL. 2 SHEETS—SHEET 1.

Witnesses.
T. H. Collinson.
John S. Hodgson.

Inventors
Joseph Field
James Field

No. 724,836. PATENTED APR. 7, 1903.
JOSEPH FIELD & JAMES FIELD.
STEERING GEAR FOR VEHICLES.
APPLICATION FILED APR. 28, 1902.
NO MODEL. 2 SHEETS—SHEET 2.

Witnesses
T. H. Collinson.
John S. Hodgson.

Inventors
Joseph Field
James Field

UNITED STATES PATENT OFFICE.

JOSEPH FIELD AND JAMES FIELD, OF NEWTON REIGNY, NEAR PENRITH, ENGLAND.

STEERING-GEAR FOR VEHICLES.

SPECIFICATION forming part of Letters Patent No. 724,836, dated April 7, 1903.

Application filed April 28, 1902. Serial No. 105,033. (No model.)

*To all whom it may concern:*

Be it known that we, JOSEPH FIELD and JAMES FIELD, traction-engine and threshing-machine owners, subjects of His Majesty the King of Great Britain, residing at Newton Reigny, near Penrith, in the county of Cumberland, England, have invented a new and useful Hand Steering-Gear for the Rear or Hind Wheels of Threshing-Machines or other Wheeled Road-Vehicles, Machines, Gun-Carriages, and the Like, (for which we have made application for a patent in Great Britain, bearing date December 13, 1901, and numbered 25,459,) of which the following is a specification.

The object of this invention is to provide an improved hand steering-gear for the rear or hind wheels of a threshing-machine or other wheeled road-vehicle in order to facilitate the movement of such vehicle in a confined space and in order to get such vehicle easily into any desired position or straight through a gateway, a further object being to provide a gear of the class specified which will move the hind wheels to any desired angle to the body or truck of the vehicle and which will facilitate the setting of a belt-driven machine in a line with the driver, a further object being to provide a gear of the class specified which can be used upon the rear or hind wheels of any road carriage or vehicle for carrying, threshing-machines, straw-elevators, chaff-cutters, grinding-mills, and other such like agricultural machinery, also for wheeled ordnance and gun carriages, vans, wagons, and every other kind of wheeled road-vehicle which is desirable to move in less space than can be accomplished with the ordinary fixed wheels; and with these and other objects in view the invention consists in the construction, position, and arrangement of parts herein described and claimed.

The invention is fully disclosed in the following specification, of which the accompanying drawings form a part, in which the separate parts of our improvement are designated by suitable reference characters in each of the views, and in which—

Figure 2:
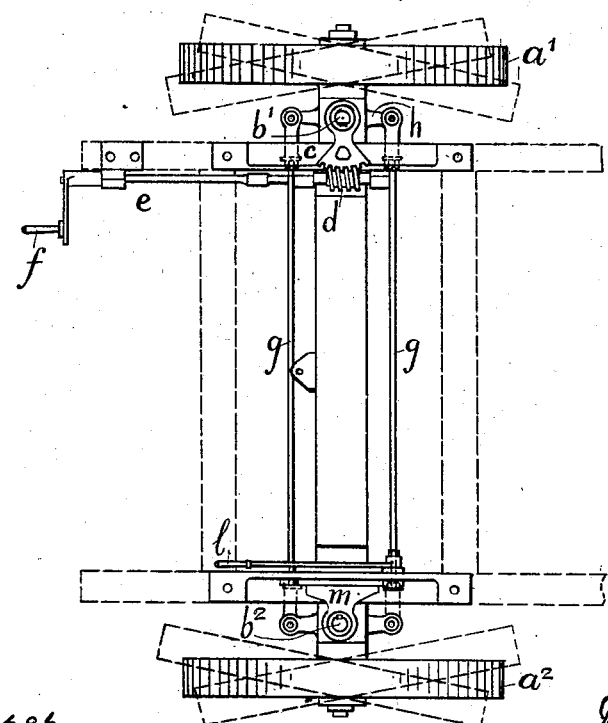
Figure 3:
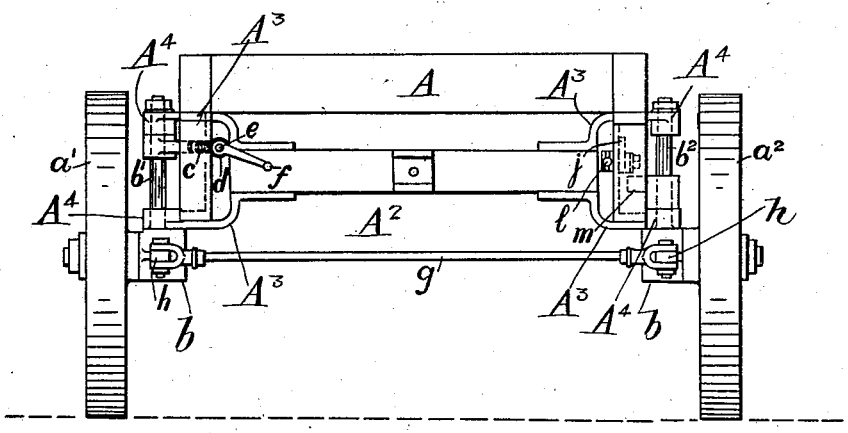
Figure 4:
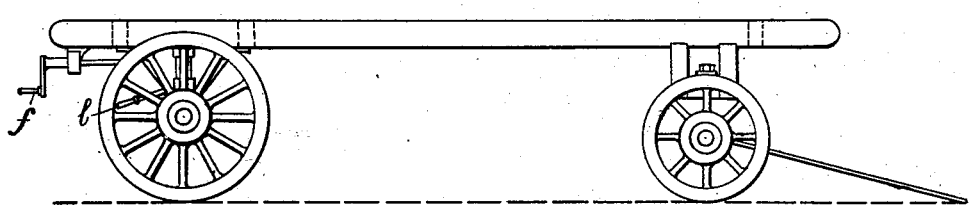

Figure 1 is a side elevation of the rear wheels and framework or truck of a threshing-machine or similar vehicle to which our invention is applied; Fig. 2, a plan view thereof; Fig. 3, a rear elevation thereof, and Fig. 4 a diagrammatic side elevation of the wheels and complete frame of the vehicle.

In the practice of our invention we provide a rigid frame or truck A, which is provided at the rear end with a bottom member $A^2$, which is arranged transversely thereof and to the opposite ends of which are secured yoke-shaped members $A^3$, each of which consists of two separate parts, and these yoke-shaped members $A^3$ are provided with vertically-arranged bearings $A^4$.

The rear wheels $a'$ and $a^2$ are mounted on stub-axles, provided at their inner edges with hubs or heads $b$, which are provided one with the short vertical shaft $b'$ and the other with the short vertical shaft $b^2$, which shafts pass through the bearings $a^4$ at the opposite sides of the truck or frame, and by means of this construction the wheels $a'$ and $a^2$ may be turned laterally in either direction, as will be readily understood, or at any desire angle to the frame or truck, as is indicated in dotted lines in Fig. 2. This angular motion of the wheels is effected by means of a toothed pinion or quadrant $c$, which is keyed to the shaft $b'$ and which is operated by means of a worm $d$ on a horizontal shaft $e$, suitably supported on the truck or frame, and to which rotary motion is transmitted by a hand-lever $f$, as clearly shown in the drawings. To convey the angular motion from the wheel $a'$ to the wheel $a^2$, rods $g$ are attached to arms $h$, which are keyed to or otherwise secured to move with the hubs or heads $b$, with which the shafts $b'$ and $b^2$ are connected.

In order to lock the wheels $a'$ and $a^2$ in a position parallel to the frame or truck of the vehicle, a movable arm $j'$ is fitted, pivoted on, and revolves upon a pin $k$, secured to the truck or frame at the side opposite the shaft $e$, and this arm $j'$ is operated by means of a hand-lever $l$, and upon lowering the arm $j'$, as indicated at $j^2$, it engages with a stop-piece $m$, which is keyed to the shaft $b^2$ and prevents angular motion of the wheels $a'$ and $a^2$. This construction is particularly adapted to accomplish the result for which it is intended and is also comparatively inexpensive, and changes in and modifications of the construction herein described may be made without departing from the spirit of our invention or sacrificing its advantages, and we reserve the right to make all such alterations thereof as fairly come within the scope of the invention.

Having fully described our invention, what we claim as new, and desire to secure by Letters Patent, is—

1. A road-vehicle the rear wheels of which are mounted on short spindles or axles the inner ends of which are provided with heads or hubs having upwardly-directed shafts which are passed through bearings secured to the truck or frame, a quadrant-gear secured to one of said shafts, a horizontal worm-shaft operating in connection with said gear, forwardly and backwardly directed arms secured to the heads or hubs of the wheel-axles, transverse rods connected with said arms, whereby the operation of the worm-shaft will turn the wheels laterally, and a locking device operating in connection with the vertical shaft opposite that with which the quadrant-gear is connected to prevent the turning of said wheels laterally, substantially as shown and described.

2. A road-vehicle the rear wheels of which are mounted on short spindles or axles the inner ends of which are provided with heads or hubs having upwardly-directed shafts which are passed through bearings secured to the truck or frame, a quadrant-gear secured to one of said shafts, a horizontal worm-shaft operating in connection with said gear, forwardly and backwardly directed arms secured to the heads or hubs of the wheel-axles, transverse rods connected with said arms, whereby the operation of the worm-shaft will turn the wheels laterally, and a locking device operating in connection with the vertical shaft opposite that with which the quadrant-gear is connected to prevent the turning of said wheels laterally, said locking device consisting of a pivotally-supported arm, a stop connected with said shaft and a lever for operating said arm, substantially as shown and described.

Dated this 1st day of March, 1902.

JOSEPH FIELD.
JAMES FIELD.

Witnesses:
T. H. COLLINSON,
JOHN S. HODGSON.